Oct. 28, 1958   K. L. SHRIDER   2,858,495
VOLTAGE COMPOUNDING CIRCUIT
Filed March 5, 1954
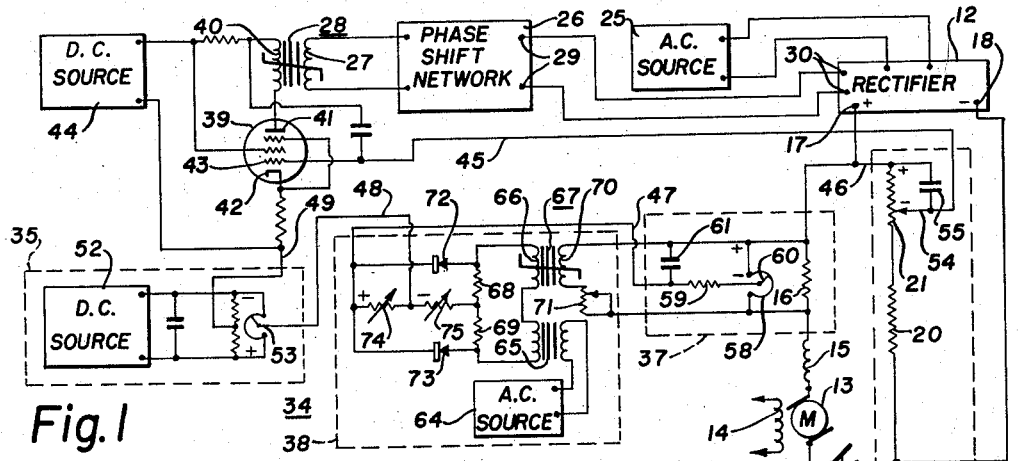
Fig. 1
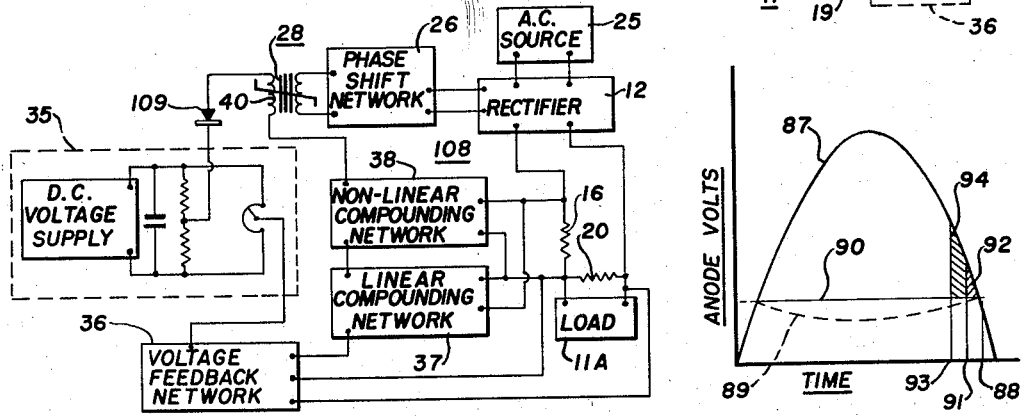
Fig. 2
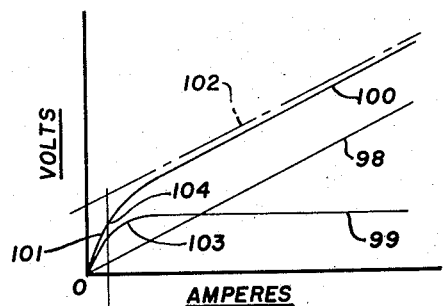
Fig. 4
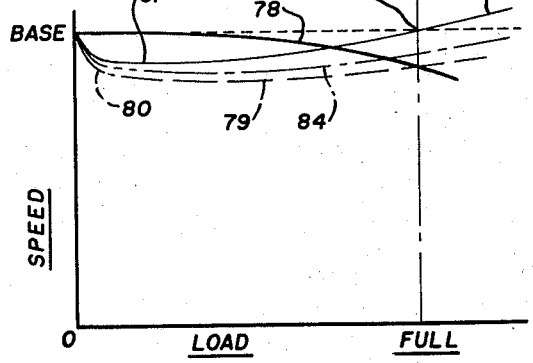
Fig. 3
Fig. 5
INVENTOR.
KENNETH L. SHRIDER
BY Woodling and Krost,
attys.

United States Patent Office 2,858,495
Patented Oct. 28, 1958

2,858,495

VOLTAGE COMPOUNDING CIRCUIT

Kenneth L. Shrider, Cleveland, Ohio, assignor to The Reliance Electric & Engineering Company, a corporation of Ohio Application March 5, 1954, Serial No. 414,289

5 Claims. (Cl. 318—308)

The invention relates in general to voltage control circuits for use with direct current loads and more particularly to a voltage compounding circuit for use with controllable rectifiers supplying variable direct voltage to a direct current motor to compensate for the resistance drop in the motor.

The ordinary direct current shunt motor operated from a pure direct current source can have a speed-load characteristic such that the speed gradually drops off as full load conditions are approached. To obtain constant speed under loading the applied armature voltage must be increased properly as the load is increased. Also, when such a direct current motor is operated from a controllable full wave rectifier operable in turn from an alternating current source, the voltage supplied to the motor armature from the rectifier does not cause the motor to have constant speed-load characteristics, unless proper grid control of the rectifier output is obtained. Using controllable rectifiers and phasing the point of tube firing linearly with motor load, the motor speed drops off rapidly under light loads and then comes up to a speed at full load which is dependent upon the compounding signal used. This rapid falling off of speed for low load conditions is caused primarily by the fact that the rate of output voltage increase per degree of grid control voltage phase shift is insufficient to maintain speed if an extremely over compounded condition of the motor at full load is to be prevented. When a resistance in the motor lead is used as a source of current feedback for compounding purposes, this is a compounding signal which is linear with respect to current, and when used will improve full load speed but does little to bring up the drooping characteristic at small loads.

An object of the invention therefore is to provide a compounding circuit which has both linear and non-linear functions so that the speed-load characteristic of a direct current motor supplied from a rectified source is such that the no load speed is maintained throughout the loading range.

Another object of the invention is to provide a resistive feedback for a linear compounding signal and a saturable magnetic circuit feedback as a non-linear compounding signal with these two signals combined to control a rectifier supplying a load.

Another object of the invention is to provide two separate voltage components in a compounding signal with one being predominant at small load and the other being predominant at large load conditions.

Another object of the invention is to provide a method of operation of a direct current motor wherein two separate compounding signals are provided to achieve close speed regulation of the motor.

Another object of the invention is to provide a circuit incorporating a saturable reactor, having an output dependent upon the load current and to utilize this output as a control signal controlling the load voltage.

Another object of the invention is to provide a motor control circuit for a motor operable from a full wave rectifier wherein a compounding signal is derived from the load current which approximates a cosecant function in part and hence is an inverse function of the anode voltage of the rectifier so that the speed-load characteristics may remain more nearly constant from zero load to full load.

Other objects and a fuller understanding of this invention may be had by referring to the following description and claims, taken in conjunction with the accompanying drawings, in which:

Figure 1 is a preferred circuit diagram of the invention;

Figure 2 is an alternative schematic diagram;

Figure 3 is a graph of speed-load characteristics;

Figure 4 is a graph of rectifier voltage; and

Figure 5 is a graph of compounding voltage.

The present invention has particular use with variable speed motor drive controls, and thus, the Figure 1 schematically illustrates a circuit for control of a direct current motor 11 operable from a controllable rectifier 12. The motor 11 is merely illustrative of a direct current load operable from a rectifier 12 and in this case the load 11 has a counterelectromotive force. The motor 11 includes an armature 13 and a field 14 with energization connections thereto, not shown. The motor 11 may also have an additional field winding 15, such as a series or interpole field. A series resistance 16 is connected in series with the field 15 and armature 13 across output terminals 17 and 18 of the rectifier 12. A main switch 19 is also provided as is customary. A resistance 20 and a voltage feedback potentiometer 21 are connected in series and connected across the output terminals 17 and 18.

The rectifier 12 may be energized from a suitable alternating current source 25. The rectifier 12 may be a full wave rectifier, such as controllable mercury pool tubes, thyratrons or other gas filled or vacuum tubes capable of supplying the required armature current. These rectifier tubes would have the usual control grid or other control means for control of the load current. The rectifier 12 may be controlled by a phase shift network 26 of conventional design. In the circuit of Figure 1 the phase shift network 26 is shown as including the variable impedance alternating current winding 27 of a saturable reactor 28. The variable impedance of the alternating current winding 27 may control the phase of the output voltage of the phase shift network 26 in conventional manner, and the output terminals 29 of the phase shift network 26 are connected to the control terminals 30 of the rectifier 12.

The Figure 1 shows a control circuit 34 for the phase shift network 26. This control circuit 34 includes generally a reference voltage network 35, a voltage feedback network 36, a linear compounding network 37, and a non-linear compounding network 38. These four networks 35–38 are effectively connected in series and apply a controlled voltage to an amplifier tube 39 which has its output connected to the direct current winding 40 of the saturable reactor 28. The amplifier tube 39 has been shown as a high vacuum pentode having an anode 41, a cathode 42, and a control grid 43. A direct current source 44 supplies operating potentials for the amplifier tube 39. The control grid 43 is connected by a lead 45 to the voltage feedback network 36 in turn connected by a lead 46 to the linear compounding network 37 which is connected by lead 47 to the non-linear compounding network 38 which is connected by a lead 48 to the reference voltage network 35, and this in turn is connected by a lead 49 to the cathode 42.

The reference voltage network 35 may include a suitable direct current source 52 supplying a reference voltage to a variable rheostat 53. The voltage feedback network 36 includes the voltage feedback potentiometer 21 with a movable contact finger 54 and a smoothing condenser 55. The linear compounding network 37 includes the series resistance 16 with a potentiometer 58 connected thereacross. A resistance 59 is connected to the movable contact finger 60 of this potentiometer 58. A smoothing condenser 61 is also connected across the upper portion of this potentiometer 58. The other end of the resistance 59 is connected to the lead 47.

The non-linear compounding network 38 includes a suitable alternating current source 64 which may be the same as the alternating current source 25. The alternating current source 64 energizes a transformer 65 which in turn energizes the alternating current winding 66, of a saturable reactor 67, and load resistors 68 and 69. The saturable reactor 67 has a direct current winding 70 connected in series with the potentiometer 71, and this series combination is connected across the resistance 16. The amount of load current passing through the resistance 16 gives a variable control current in the direct current winding 70 to thus variably affect the impedance of the alternating current winding 66. This will vary the alternating current voltage across the load resistors 68 and 69. The combined load resistors 68 and 69 thus provide a variable alternating voltage for rectifiers 72 and 73 which may be dry disk rectifiers since they need be of only small capacity. The rectifiers 72 and 73 supply full wave rectified energy to load resistors 74 and 75. The resistors 74 and 75 have both been shown as variable although it will be understood that either or both may be variable within the skill of the mechanic. The lead 48 connects to the junction between the resistors 74 and 75.

The Figure 3 is a speed-load graph showing several curves. Curve 78 shows a typical operation of a direct current shunt motor operating from a pure direct current source. Curve 79 shows operation of the same motor as supplied by full wave rectified energy such as from controllable rectifier tubes, utilizing a grid phasing which is linear with respect to loading. It will be noted that the curve 79 has an undesirable dip at 80 at low load conditions. Many previous circuits have utilized a resistive feedback control such as that effected by resistance 16 in the present circuit to give a compounding effect to the rectifier so as to attempt to hold the speed constant with the load. Such compounding circuits have been linear in that since they have used a resistance in the load circuit the compounding signal has varied linearly and directly with the load current. Such systems have established speed-load curves such as that shown at 81. This linear compounding can establish motor speed at full load equal to the no-load speed, if enough linear compounding is used, as shown at point 82. However, under such conditions the curve 81 continues to rise and at above full load the speed tends to rise as shown at the portion 83 of the curve. This is an unstable condition since with increasing load the speed increases and is similar to the dangerous condition of cumulative compounding. Also in the region from 80 to 82 the motor tends to hunt. Thus, with linear compounding a compromise curve 84 has been used to partially bring up full load speed. However, it will be noted that the family of curves 79, 81, and 84 each have a pronounced and severe dip in speed for small load conditions.

The Figure 4 shows a curve of anode voltage 87 applied to the rectifier supplying the motor such as the rectifier 12. With a phase shift control of the voltage supplied to the grids of the rectifier 12, the zero load condition would be such that the grid voltage was phased nearly 180° back of the anode voltage such as at a point 88. The curve 89 may represent the critical grid volts curve, and the horizontal line 90 may represent the counterelectromotive force of the motor 11 together with any arc drop in the rectifier tube in the full wave rectifier 12 for one particular motor operating condition. If the phase shift network 26 is phased such that the rectifier grid voltage is less lagging, then a point 91 will be reached wherein a pulse of voltage indicated by the shaded triangle 92 is supplied to the armature 13. This small pulse of current 92 will turn the motor over for very light loads, such as windage and friction. If the motor is loaded a little more, then the control circuit 34 gives a signal to the rectifier 12 to increase the rectified current to the armature 13. If the compounding signal is linear and causes the firing angle to be advanced linearly to a point 93, then a pulse of voltage equal to the large triangle 94 will be supplied to the armature 13. It will be noted that the large triangle 94 is nearly four times as large as the triangle 92. Thus, it will be seen that one must phase rapidly at first and then phase over with less rapidity with increasing load if the dip 80 is to be eliminated and a rise in speed with loading is to be prevented.

The Figure 5 shows a graph of volts versus amperes obtained in the compounding circuits of the present case. The curve 98 represents the linear compounding signal derived from the linear compounding network 37. The curve 99 illustrates the non-linear curve obtained from the non-linear compounding network 38. These two compounding signals are additively combined to produce a combined curve 100. This curve 100 rises rapidly at 101 and then levels off to become quite linear and for reasonable loading approaches a line 102 having the same slope as the curve 98. The curve 99 is derived from the saturable reactor 67 which is so designed as to saturate easily so that the knee 103 of the saturation curve is close to the origin of the curve. This combined curve 100 thus can closely approximate a cosecant function in part which is that which is desired to counteract the fact that the right-hand portion of the anode voltage curve 87 is a sine curve. Also, this curve 100 closely approximates in part the inverse function of the anode voltage curve 87.

*Operation*

The switch 19 may be assumed to be closed, and the rectifier 12 supplying rectified full wave unfiltered current to the armature 13. The control circuit 34 is supplying just sufficient control voltage to the phase shift network 26 to maintain a particular no-load speed setting for the load, which in this case is shown as a motor. The reference rheostat 53 may be considered as a speed control signal since this is a reference voltage which will establish the basic magnitude of bias on the amplifier tube 39. Starting with the cathode 42, the total bias on the control grid 43 is obtained by picking up a positive or negative reference voltage at rheostat 53, picking up a positive non-linear compounding voltage at resistor 74, picking up a positive linear compounding voltage at the upper portion of potentiometer 58, and picking up a negative feedback voltage at the feedback potentiometer 21. Additional control circuits may be supplied in the lead 45, such as current limit or time limit acceleration, if desired. For a particular speed setting, as determined by rheostat 53, and with low load only a small voltage is developed across resistance 16. This may be such as at the point 104 on the curve 100. In this condition the linear compounding network 37 is not particularly effective and most of the compounding signal is derived from the non-linear compounding network 38. With a small direct current voltage across resistance 16 the direct current winding 70 has a small voltage across it but may be sufficient to cause saturation of the reactor core, and thus the alternating current winding 66 has a low impedance. This means a large alternating current voltage across resistors 68 and 69 which upon being rectified gives a large non-linear compounding signal across the resistor 74. This large signal causes the amplifier tube 39 to pass more current to the direct current winding 40 of the saturable reactor 28. This decreases the impedance of the alternating current winding 27 rapidly thus phasing over rapidly the control grid voltage on the rectifier 12 to thus give a considerably increased output voltage. This increased output voltage occurs near the dip at 80 in the speed-load curve so that it approaches the curve 78. Now, if the load on the motor 11 is increased slightly, this linearly increases the signal across the potentiometer 58, but the saturable reactor 67 saturates quickly so that it is less effective and the non-linear compounding signal across resistor 74 does not increase much more. For near full load conditions the saturable reactor 67 is completely saturated and the majority of the compounding signal comes from the linear compounding network 37. This gets rid of the dip at 80 in the speed curve 79 and also brings up the full load speed still better than that shown for the pure direct current source operation shown at 78. The movable contact finger 60 may be varied to vary the amount of linear compounding which varies the rate of rise of the curve 98. The potentiometer 71 may be used to vary the knee 103 of the saturation curve 99, and either or both of the resistors 74 and 75 may be variable to vary the maximum amount of the non-linear compounding signal.

The combined linear and non-linear compounding networks 37 and 38 may be considered as combined impedance means which operate differently at different load currents. As shown in Figure 5, at full load the linear compounding network 37 predominates, and hence together the networks 37 and 38 produce a compounding voltage signal which has a given ratio of volts per load ampere. For light loads, the non-linear compounding network predominates and hence together the networks 37 and 38 produce a compounding voltage signal which has a substantially greater ratio of volts per load ampere.

The Figure 2 shows a modified circuit 108. This circuit again may include the phase shift network 26, the alternating current source 25, the rectifier 12, the saturable reactor 28, the reference voltage network 35, the voltage feedback network 36, the linear compounding network 37, and the non-linear compounding network 38. A load 11A has been shown and this includes a series load resistance 16 and voltage feedback resistance 20. The compounding networks 37 and 38 are again connected across the resistance 16, and the voltage feedback network is connected across the resistance 20. In this case the four networks 35, 36, 37, and 38 are shown as being connected in series with a rectifier 109 and with the direct current winding 40 of the saturable reactor 28. Thus, the Figure 2 shows that the amplifier tube 39 may be omitted if the sensitivity of the circuit 108 is sufficiently great so that the saturable reactor 28 may control the rectifier 12 through the phase shift network 26. The rectifier 109 is supplied to prevent reversal of current through the direct current winding 40. The circuit of Figure 2 will operate essentially the same as the circuit of Figure 1.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A voltage compounding circuit for vacuum tube control of a grid controlled rectifier supplying the load current of a direct current motor, said circuit comprising, first resistance means connected effectively in series with said motor for establishing a first unidirectional voltage component which varies linearly and directly with motor loading, potentiometer means to vary the rate of rise of said first voltage component, a saturable reactor having alternating current and direct current windings, means for energizing said alternating current winding from an alternating voltage source, a load resistor, means for connecting in series said alternating current winding, said alternating voltage source, and said load resistor to establish said load resistor as a variable alternating voltage source, rectifier means connected to said load resistor, a direct current load resistor connected to said rectifier means, means to connect said direct current winding effectively in parallel with said first resistance means to establish a second unidirectional voltage component across said direct current load resistor dependent upon the saturation curve of said saturable reactor, means for adjusting the saturation knee of the saturation curve, means for adjusting the maximum value of said second voltage component in accordance with the saturated output value, and means to additively apply said first and second voltage components to said vacuum tube control to compensate for the IR drop of said direct current motor.

2. A voltage compounding circuit for control of a rectifier supplying the load current of a direct current motor, said circuit comprising, first means for establishing a first unidirectional voltage component which varies linearly and directly with motor loading, a saturable reactor having alternating current and direct current windings, means for energizing said alternating current winding from an alternating voltage source, a load resistor, means for connecting in series said alternating current winding, said alternating voltage source, and said load resistor to establish said load resistor as a variable alternating voltage source, rectifier means connected to said load resistor, a direct current load resistor connected to said rectifier means, means to connect said direct current winding effectively in parallel with said first means to establish a second unidirectional voltage component across said direct current load resistor dependent upon the saturation curve of said saturable reactor, means for adjusting the saturation knee of the saturation curve, means for adjusting the maximum value of said second voltage component in accordance with the saturated output value, and means to additively apply said first and second voltage components to said control to compensate for the IR drop of said direct current motor.

3. A control circuit for a rectifier supplying a load, said circuit comprising, first means in series with said load for establishing a first unidirectional voltage component which varies linearly and directly with load current, a saturable reactor having alternating current and direct current windings, a load resistor, means for energizing in series said alternating current winding and said load resistor from an alternating voltage source, rectifier means having an output and having an input connected to said load resistor, means to connect said direct current winding effectively in parallel with said first means to establish a second unidirectional voltage component across said rectifier output dependent upon the saturation curve of said saturable reactor, and means to serially add said first and second voltage components to control said rectifier.

4. A voltage compounding circuit for control of a rectifier supplying the load current of a load having counter electromotive force, said circuit comprising, first means in series with said load for establishing a first unidirectional voltage component which varies linearly and directly with load current, a saturable reactor having alternating current and direct current windings, alternating voltage source terminals, an alternating current load resistor, means for connecting in series said alternating current winding, said alternating voltage source terminals, and said load resistor, rectifier means connected to said alternating current load resistor, a direct current load resistor connected to said rectifier means, means to connect said direct current winding effectively in parallel with said first means to establish a second unidirectional voltage component across said direct current load resistor dependent upon the saturation curve of said saturable reactor, and means to serially add said first and second voltage components and apply same to said control to compensate for the IR drop of said load.

5. A voltage compounding circuit for control of a rectifier supplying the load current of a direct current motor, said circuit comprising, first means for establishing a first unidirectional voltage component which varies linearly and directly with motor loading, a saturable reactor having alternating current and direct current windings, means for energizing said alternating current winding from an alternating voltage source, a load resistor, means for connecting in series said alternating current winding, said alternating voltage source, and said load resistor to establish said load resistor as a variable alternating voltage source, rectifier means connected to said load resistor, a direct current load resistor connected to said rectifier means, means to connect said direct current winding effectively in parallel with said first means to establish a second unidirectional voltage component across said direct current load resistor dependent upon the saturation curve of said saturable reactor, and means to serially add said first and second voltage components and apply same to said control to compensate for the IR drop of said direct current motor.

References Cited in the file of this patent
UNITED STATES PATENTS

| | | |
|---|---|---|
| 2,082,496 | Howe | June 1, 1931 |
| 2,488,536 | Haneiko | Nov. 22, 1949 |
| 2,653,288 | Kubler | Sept. 22, 1953 |
| 2,683,847 | McLane | July 13, 1954 |